(12) United States Patent
Song

(10) Patent No.: US 11,944,886 B2
(45) Date of Patent: Apr. 2, 2024

(54) SET PIECE SIMULATION SYSTEM AND METHOD FOR PROVIDING SIMULATION BY USING SAME

(71) Applicant: CODE REACH CORP., Seoul (KR)

(72) Inventor: Jin Woo Song, Yongin-si (KR)

(73) Assignee: CODE REACH CORP., Seoul (KR)

(*) Notice: Subject to any disclaimer, the term of this patent is extended or adjusted under 35 U.S.C. 154(b) by 673 days.

(21) Appl. No.: 17/266,149

(22) PCT Filed: Jul. 25, 2019

(86) PCT No.: PCT/KR2019/009225
§ 371 (c)(1),
(2) Date: Feb. 5, 2021

(87) PCT Pub. No.: WO2020/032442
PCT Pub. Date: Feb. 13, 2020

(65) Prior Publication Data
US 2021/0299537 A1  Sep. 30, 2021

(30) Foreign Application Priority Data

Aug. 9, 2018  (KR) .......................... 10-2018-0093048

(51) Int. Cl.
*A63B 69/00* (2006.01)
*A63B 24/00* (2006.01)
(Continued)

(52) U.S. Cl.
CPC ........ *A63B 69/002* (2013.01); *A63B 24/0003* (2013.01); *A63B 24/0021* (2013.01);
(Continued)

(58) Field of Classification Search
None
See application file for complete search history.

(56) References Cited

U.S. PATENT DOCUMENTS 10,661,149 B2 * 5/2020 Kudirka ............ A63B 71/0622
2014/0080638 A1 * 3/2014 Feng .................. A63B 24/0006
473/439
(Continued)

FOREIGN PATENT DOCUMENTS

EP  3 324 200 A1  5/2018
JP  06-254185 A  9/1994
(Continued)

OTHER PUBLICATIONS

International Searching Authority, International search report for PCT/KR2019/009225 dated Oct. 31, 2019.
(Continued)

*Primary Examiner* — Reginald A Renwick
(74) *Attorney, Agent, or Firm* — Sughrue Mion, PLLC

(57) ABSTRACT

A set piece simulation system provides a simulation of a set piece in soccer. The system includes a data transmission/reception unit, an image output unit, a kick information analysis unit, and an image processing unit. The data transmission/reception unit receives ball location information from a sensing device, the image output unit outputs a set piece background screen to an image output device, the sensed ball location and auxiliary information including angle(s) based on the ball location, the data transmission/reception unit receives a user's kick motion image and kick information including speed, spin rate, and/or direction of the ball, the kick information analysis unit analyzes movement path of the ball, and the image processing unit displays trajectory of the ball and the speed and spin information of the ball on the set piece background screen based on the analyzed movement path.

10 Claims, 15 Drawing Sheets

(51) Int. Cl.
*A63B 71/06* (2006.01)
*G06F 3/0488* (2022.01)

(52) U.S. Cl.
CPC ...... *A63B 24/0075* (2013.01); *A63B 71/0622* (2013.01); *G06F 3/0488* (2013.01); *A63B 2024/0031* (2013.01); *A63B 2024/0034* (2013.01); *A63B 2024/0056* (2013.01); *A63B 2024/0081* (2013.01); *A63B 2071/0638* (2013.01); *A63B 2220/807* (2013.01)

(56) References Cited

U.S. PATENT DOCUMENTS

| | | | |
|---|---|---|---|
| 2014/0135956 A1* | 5/2014 | Thurman | A63B 69/002 |
| | | | 700/91 |
| 2015/0379351 A1* | 12/2015 | Dibenedetto | G02B 27/017 |
| | | | 345/633 |
| 2017/0056743 A1* | 3/2017 | Kroken | A63B 71/022 |
| 2017/0095716 A1* | 4/2017 | Lewis | A63B 69/40 |
| 2018/0137662 A1* | 5/2018 | Simeone | G06T 7/70 |
| 2019/0126125 A1* | 5/2019 | Kudirka | G06T 19/006 |

FOREIGN PATENT DOCUMENTS

| | | |
|---|---|---|
| JP | 2004-097662 A | 4/2004 |
| KR | 10-2014-0091630 A | 7/2014 |
| KR | 10-1841427 B1 | 5/2018 |

OTHER PUBLICATIONS

International Searching Authority, Written opinion for PCT/KR2019/009225 dated Oct. 31, 2019.

\* cited by examiner

110

SET PIECE SIMULATION SYSTEM AND METHOD FOR PROVIDING SIMULATION BY USING SAME

CROSS-REFERENCE TO RELATED APPLICATIONS

This application is a National Stage of International Application No. PCT/KR2019/009225 filed Jul. 25, 2019, claiming priority based on Korean Patent Application No. 10-2018-0093048 filed on Aug. 9, 2018.

TECHNICAL FIELD

The present invention relates to a set piece simulation system and a method for providing a simulation using the same, and more particularly, to a set piece simulation system and a method for providing a simulation using the same capable of providing an enhanced sense of reality like playing in an actual field.

BACKGROUND ART

Soccer classes are mainly taken outdoors, but cannot be taken in the winter or bad weather (e.g. heavy rain, ultraviolet, fine dust, ozone alarms, etc.). In addition, in the case of urban areas, it is difficult to secure a sufficient space to practice soccer. The youth soccer classes and the like in the downtown are taken indoors in many cases, but in an indoor space where it is difficult to secure enough space, training is focused on simple technical practices such as dribbling practice and mini-games.

Since the actual soccer field has the length of about 90 m to 120 m and the width of about 45 m to 90 m, a strong kick using a wide space is often required. In addition, since a sophisticated pass is required by considering the location and movement of players in the same team and the opponent team, both power and sophistication are required. Soccer training in the indoor is not suitable for the practice of a strong and sophisticated kick required for the actual soccer game. If a kicking practice environment similar to outdoor may be provided for soccer classes in the indoor, more efficient training will be made.

On the other hand, recently, play facilities that provide a simulation environment such as screen golf, screen baseball, and the like have been popular. A conventional simulation system adds interest of a game and provides realism like enjoying the game in an actual outdoor by calculating a physical quantity according to the hitting of a ball to show a video on a moving trajectory to a user.

In sports such as golf or baseball, the ball is hit with a strong force. At this time, a tool such as a golf club and a bat is used. A baseball bat has features in which the specifications are almost constant and an area of hitting the ball is limited. In the case of the screen golf, since the length of a club varies and an angle formed between a head and the ground varies, a gold club is pre-set before playing the golf and then the golf is played. As such, golf or baseball, etc., have a feature capable of minimizing variables to track the trajectory of the ball.

On the other hand, in the case of the soccer, a foot is used for kicking a soccer ball, and there is a feature that the foot shape, the leg length, and the like of a kicker are not uniform. In addition, since the size of the soccer ball is also larger than that of a golf ball or baseball ball in other ball games, the location of a hit point has a large effect on the trajectory of the ball. As such, considering the hit point of the soccer ball, the heights of the left and right shoulders according to the movement of the gravity center of a kicker, a location of a body's central axis, a kicker's leg length, a kicker's foot shape, a motion of a foot at the time of hitting, etc., relatively more physical calculations than other sports are required.

Meanwhile, a set-piece situation may be defined as a situation in which while the ball is stopped in the ground in the soccer, the game is operated through a promised play. For example, while a kicker kicks the ball through the premised play by obtaining a free kick, a corner kick, a penalty kick, etc., the kicker gets an opportunity to attack an opponent goalpost, which may be referred to as the set-piece situation. When the kicker wants to simulate a sophisticated and strong kick like a set piece such as a penalty kick, a free kick, etc., since the trajectory of the soccer ball may be greatly affected by the strength of the kick, the direction of the wind and the intensity of the wind, etc., it is necessary to calculate the physical quantities in consideration of the variables.

Due to these features and variables, in order to simulate the set piece situation of the soccer, it is required to configure a simulation system different from those of conventional ball sports using tools, such as screen golf, screen baseball or screen tennis.

DISCLOSURE

Technical Problem

An object of an embodiment of the present invention is to provide a set piece simulation system capable of making a strong and sophisticated kick practice in a similar environment to an actual set piece situation.

Further, an object of another embodiment of the present invention is to provide a simulation using a set piece simulation system.

The objects of the present invention are not limited to the above-mentioned objects, and other objects not mentioned can be clearly understood to those skilled in the art from the following description.

Technical Solution

According to an aspect of the present invention, there is provided a system for providing a set piece simulation, the system including a data transmission/reception unit, an image output unit, a kick information analysis unit, and an image processing unit, wherein the data transmission/reception unit receives the location of a soccer ball from a sensing device, the image output unit outputs a set piece background screen to an image output device which wiredly or wirelessly communicates with the data transmission/reception unit and outputs, to one side of the image output device, the sensed location of the soccer ball and auxiliary information in which a left or right angle or an upper or lower angle based on the location of the soccer ball is provided in the form of an image or text, the data transmission/reception unit receives a user's kick motion image transmitted through an image capturing device and kick information including one or more pieces of information about the speed, spin rate, and direction of the soccer ball caused by the user's kick, the kick information analysis unit analyzes the movement path of the soccer ball by analyzing the kick motion image or the kick information, and the image processing unit displays the trajectory of the soccer ball and the speed and spin information of the ball in a predetermined area of the set piece background screen by using the analyzed movement path.

The kick information analysis unit may be provided to correct the movement path by using environmental condition data provided from a room condition control device received through the data transmission/reception unit by analyzing the movement path of the soccer ball, wherein the room condition control device may be provided with a moisture providing device or a blowing device.

The data transmission/reception unit may receive coaching information from the user device, the kick information analysis unit may generate hitting information about the speed, posture, and direction of a kick, or a hitting point of the soccer ball using the coaching information, the image output unit may be provided to display the hitting information in a predetermined area of the image output device, and the user device may include a touch input unit, wherein the coaching information may include dragging information input through the touch input unit.

The image output unit may be provided to output a target or virtual goalpost image generated by using actual set piece situation information input from the user device in a predetermined area displayed with the image of the image output device.

The image output device may include a monitor having a display unit, a screen device including a screen and a projection device, or a laser output device (a holographic device using a laser) that outputs a virtual image using a laser.

According to another aspect of the present invention, there is provided a method for providing a set piece simulation including: receiving, by means of a data transmission/reception unit of a service server, the location of a soccer ball from a sensing device; outputting, by means of an image output unit of the service server, a set piece background screen to an image output device which wiredly or wirelessly communicates with the data transmission/reception unit and outputting, to one side of the image output device, the sensed location of the soccer ball and auxiliary information in which a left or right angle or an upper or lower angle based on the location of the soccer ball is provided in the form of an image or text; receiving, by means of the transmission/reception unit, a user's kick motion image transmitted through an image capturing device and kick information including one or more pieces of information about the speed, spin rate, and direction of the soccer ball caused by the user's kick; analyzing, by means of a kick information analysis unit of the service server, the movement path of the soccer ball by analyzing the kick motion image or the kick information; and displaying, by means of an image processing unit of the service server, the trajectory of the soccer ball and the speed and spin information of the ball in a predetermined area on the set piece background screen by using the analyzed movement path.

The analyzing of the movement path of the soccer ball may further include correcting the movement path by using environmental condition data provided from a room condition control device received through the data transmission/reception unit, wherein the room condition control device may be a moisture providing device or a blowing device.

The method may further include receiving, by means of the data transmission/reception unit, coaching information from the user device; generating, by means of the kick information analysis unit of the service server, hitting information about the speed, posture, and direction of a kick, or a hitting point of the soccer ball by using the coaching information; and displaying, by means of the image output unit of the service server, the hitting information in a predetermined area of the image output device, wherein the user device may include a touch input unit and the coaching information may include dragging information input through the touch input unit.

The outputting of the auxiliary information may further include outputting, by means of the image output unit, a target or virtual goalpost image generated by using actual set piece situation information input from the user device in a predetermined area displayed with the image of the image output device.

Advantageous Effects

According to the embodiment of the present invention, it is possible to provide a set piece simulation system capable of making a strong and sophisticated kick practice in a similar environment to an actual set piece situation.

Further, according to another embodiment of the present invention, it is possible to provide a simulation using the set piece simulation system.

The effects according to the embodiments of the present invention are not limited by the contents exemplified above, and other various effects are included in the present specification.

BEST MODEL

A user device 40 includes a touch input unit to be displayed in a predetermined area of an image output device, and the coaching information may include dragging information input by the touch input unit.

When the coaching information is input by a separate user device 140, the coaching information is output to the image output device such as a screen to perform effective coaching. The coaching information may be input by the user device 140 with a touch screen, and the like, and a trainer may intuitively input a direction, a distance, and the like of a kick. This information may be converted into text information and the like by calculating reversely physical quantities when kicking to provide information about how to make a kick to a user.

Figure 1:
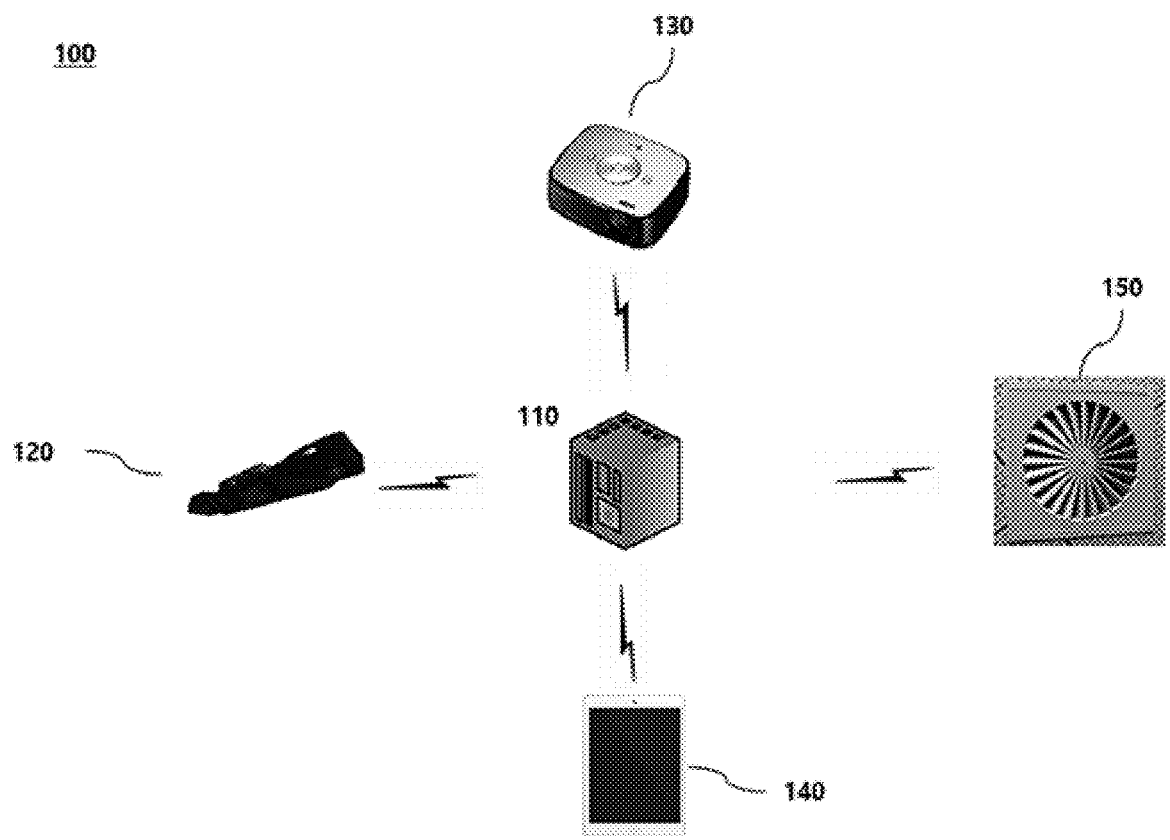
FIG. 1 illustrates a system diagram of a set piece simulation system according to an embodiment of the present invention.
Figure 2:
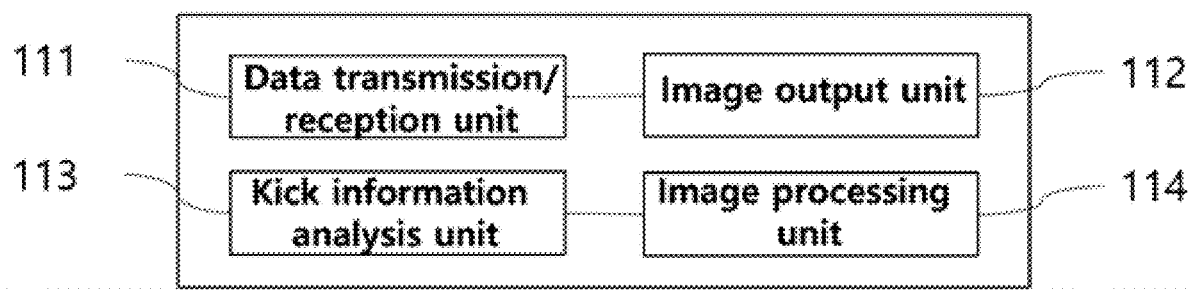
FIG. 2 illustrates a system block diagram of a service server according to an embodiment of the present invention.
Figure 3:
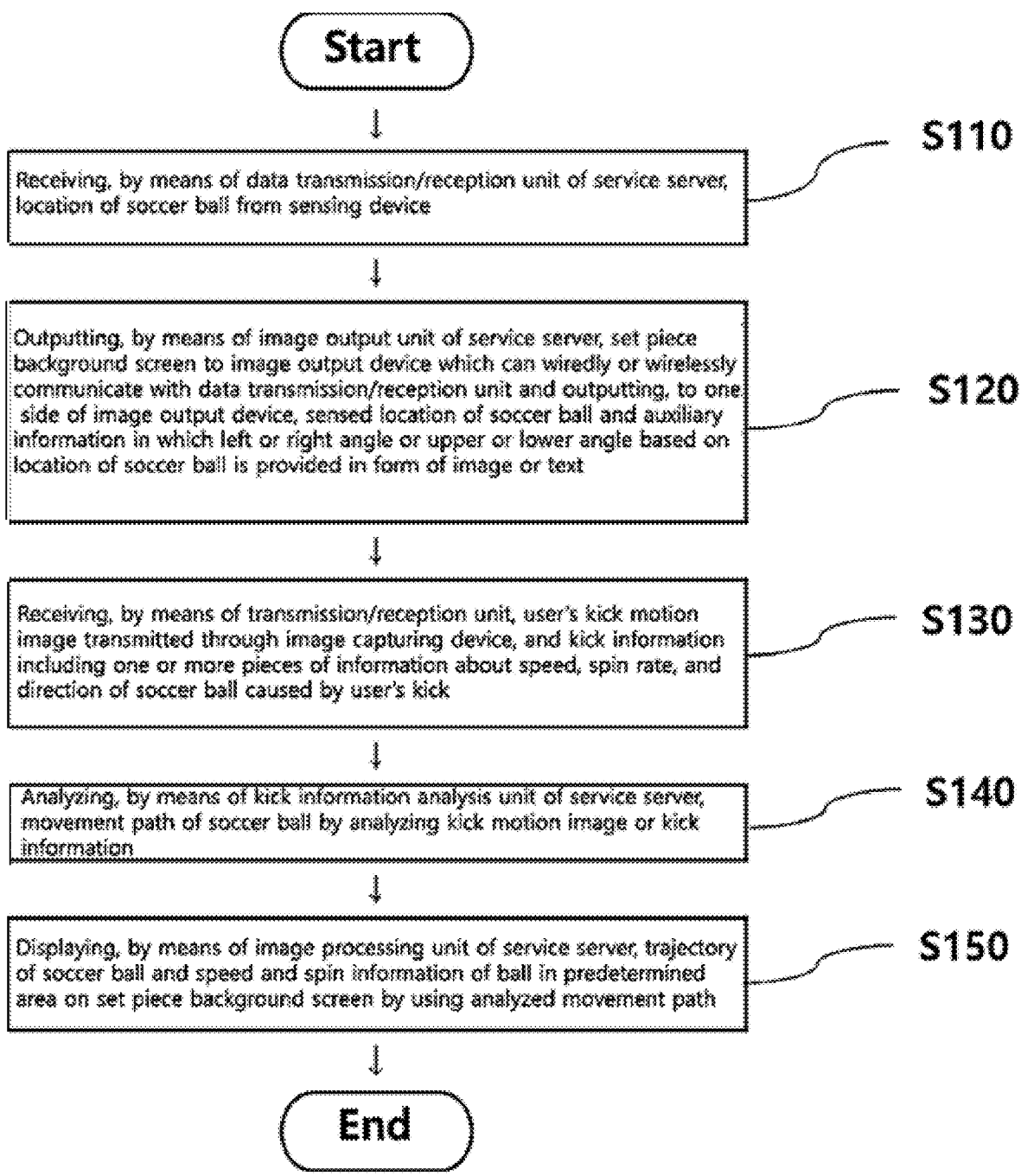
FIG. 3 illustrates a flowchart of a method for providing a set piece simulation according to an embodiment of the present invention.

FIG. 3 illustrates a flowchart of a method for providing a set piece simulation according to an embodiment of the present invention.

Hereinafter, a method of providing a set piece simulation according to another embodiment of the present invention will be described with reference to FIG. 3. First, the method of providing the set piece simulation according to the embodiment of the present invention includes receiving the location of a soccer ball from a sensing device 120 through a data transmission/reception unit 111 of a service server 110 (S110).

The method of providing the set piece simulation according to the embodiment of the present invention may be performed by using sensor equipment used in the conventional screen sports, which may be provided to sense whether the soccer ball is placed in a location suitable for the kick. The location sensed with the soccer ball placed in the location suitable for the kick may be selected without limitation as long as the location is a location suitable to analyze a physical quantity according to the movement of the soccer ball by means of a sensor included in the sensing device 120.

Next, the method includes outputting a set piece background screen to an image output device which can wiredly or wirelessly communicate with the data transmission/reception unit 111 and outputting, to one side of the image output device, the sensed location of the soccer ball and auxiliary information in which a left or right angle or an upper or lower angle based on the location of the soccer ball is provided in the form of an image or text, by means of the image output unit 112 of the service server 110 (S120).

Figure 5:
FIG. 5 is a diagram illustrating a penalty kick in a set piece situation in a set piece simulation system according to an embodiment of the present invention.

FIG. 5 is a diagram illustrating a penalty kick in a set piece situation in a set piece simulation system according to an embodiment of the present invention. Based on the penalty kick situation associated with the method of providing the set piece simulation according to the embodiment of the present invention, for example, when the location of the soccer ball is sensed to be placed in the location for making a penalty kick, as illustrated in FIG. 5, a background image of a goalpost, a goalkeeper, and the like for the penalty kick is output. Referring to FIG. 5, it can be seen that gradations indicated by angles based on a horizontal axis under the screen of the image output device are separately illustrated. Further, angles are indicated based on a left vertical axis.

Figure 6:
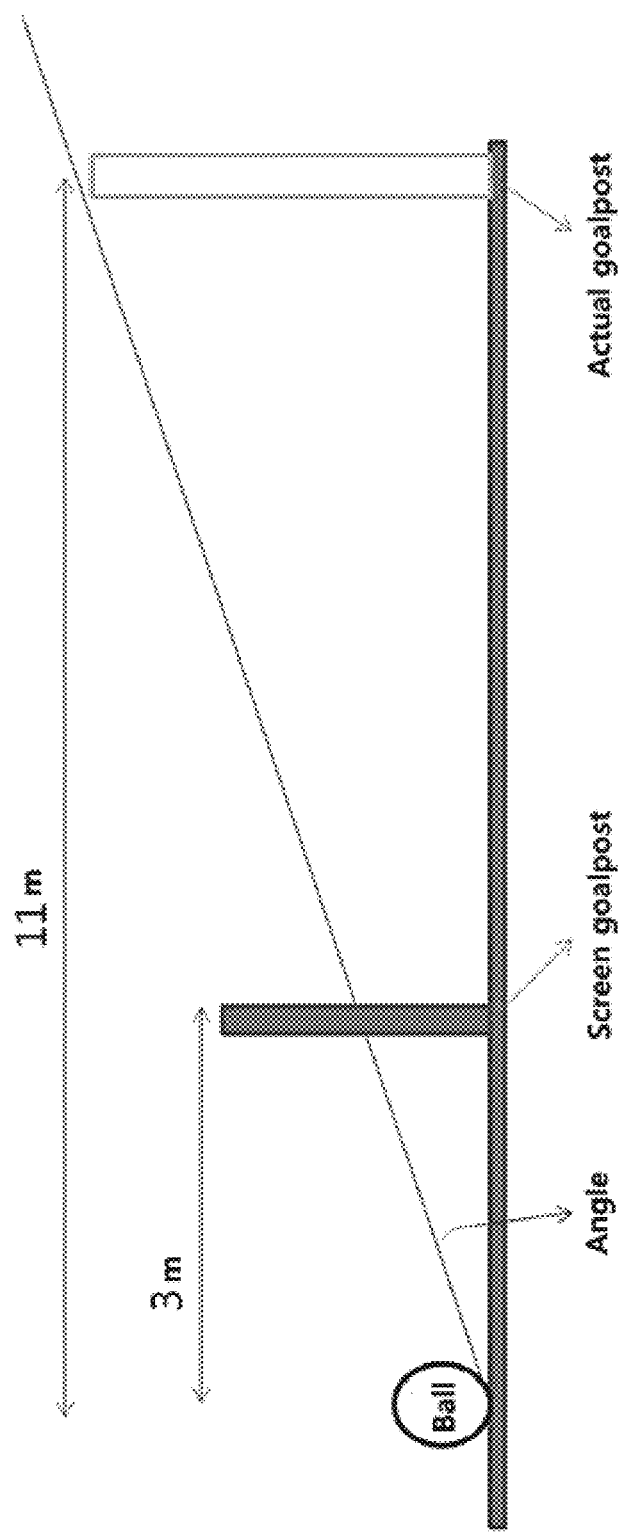
FIG. 6 is a diagram illustrating a difference between a set piece simulation system according to an embodiment of the present invention and an actual situation.

FIG. 6 is a diagram illustrating a difference between the set piece simulation system according to the embodiment of the present invention and an actual situation. Referring to FIG. 6, images of a goalpost and a goalkeeper are displayed on the screen included in the image output device, and when an indoor space has an area smaller than the actual field, it can be seen that there is a significant difference from a case of an actual penalty kick.

Since a goalpost projected on a visible screen has an advantage of doubling an interest and feeling the fun of the game, unlike the actual goalpost, the goalpost may be illustrated to be optimized on the screen viewed by a user. Therefore, if the ball is kicked according to the goalpost (hereinafter, a screen goalpost) displayed on the screen, there is a difference from the actual situation. For example, the ball may be kicked by targeting three circles displayed on the top of the goalpost illustrated in FIG. 5, and when the screen goalpost is located closer than the actual goalpost, the target of the screen goalpost may be hit, but resulting in kicking up the ball to a much higher location than the actual goalpost.

Accordingly, auxiliary information, in which the left or right angle or the upper or lower angle based on the location of the soccer ball is provided in the form of an image or text, corresponds to a value obtained by calculating a distance from a goalpost or crossbar of the actual goalpost and a distance from the screen goalpost based on the soccer ball in consideration of the actual goalpost by a predetermined method. Therefore, the auxiliary information may be calculated differently according to a setting value of the screen goalpost to be outputted, respectively.

To the end, in the outputting of the auxiliary information, the image output unit 112 may be provided to output a target or virtual goalpost image generated using actual set piece situation information input from the user device 140 in a predetermined area displayed with the image of the image output device.

Figure 7:
FIG. 7 illustrates an appearance of an image output device on which an image of an auxiliary goalpost considering an actual situation is projected.
Figure 8:
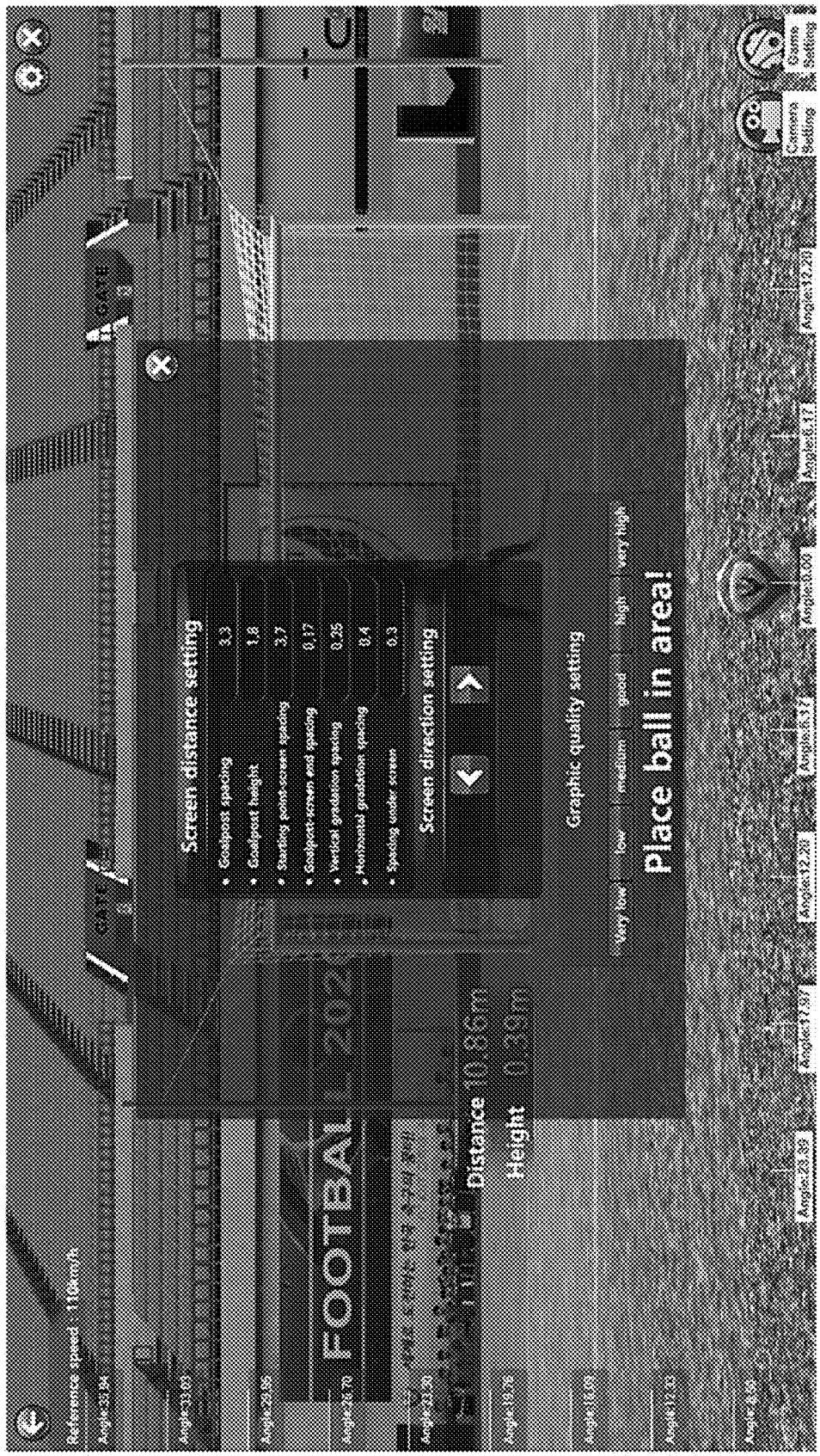
FIG. 8 is an exemplary diagram related to an information input for displaying indicators of the auxiliary goalpost considering the actual situation.

FIG. 7 illustrates an appearance of an image output device on which an image of an auxiliary goalpost considering an actual situation is projected and FIG. 8 is an exemplary diagram related to an information input for displaying indicators of the auxiliary goalpost considering the actual situation.

Referring to FIGS. 7 and 8, a user who wants to practice a penalty kick in an actual situation may practice a kick using the auxiliary information of values which has been input or preset by using the user device 140. For example, the user may input set piece situation information by the user device 140.

FIG. 7 illustrates an image of a virtual auxiliary goalpost obtained by calculating conditions of a screen goalpost and an actual goalpost, in which three circles under the screen illustrate target sites after assuming the actual goalpost and a bright line around the circle illustrates an auxiliary goalpost output in a size by considering a proportional relation with the actual goalpost.

FIG. 8 illustrates a user input window related to a screen distance setting for an auxiliary goalpost, and angle information of a horizontal axis or a vertical axis. According to FIG. 8, an input window may be displayed to enable an user input, such as a screen distance setting including a goalpost spacing, a goalpost height, a starting point-screen spacing, a goal post-screen end spacing, a vertical gradation spacing, a horizontal gradation spacing, a spacing under the screen, etc., and a graphic quality setting including very low, low, medium, good, high, very high, etc. Such information may be input through the user device 140.

FIGS. 7 and 8 illustrate a penalty kick, but the set piece simulation system according to the embodiment of the present invention is not limited thereto, and a target matched with reality is set according to a set piece situation of a soccer game or the like, for example, a set piece situation considering a corner kick or free kick situation to be presented to the user.

Next, the method includes receiving a user's kick motion image transmitted through an image capturing device and kick information including one or more pieces of information about speed, spin rate, and direction of the soccer ball caused by the user's kick, by means of the transmission/reception unit (S130).

Figure 9:
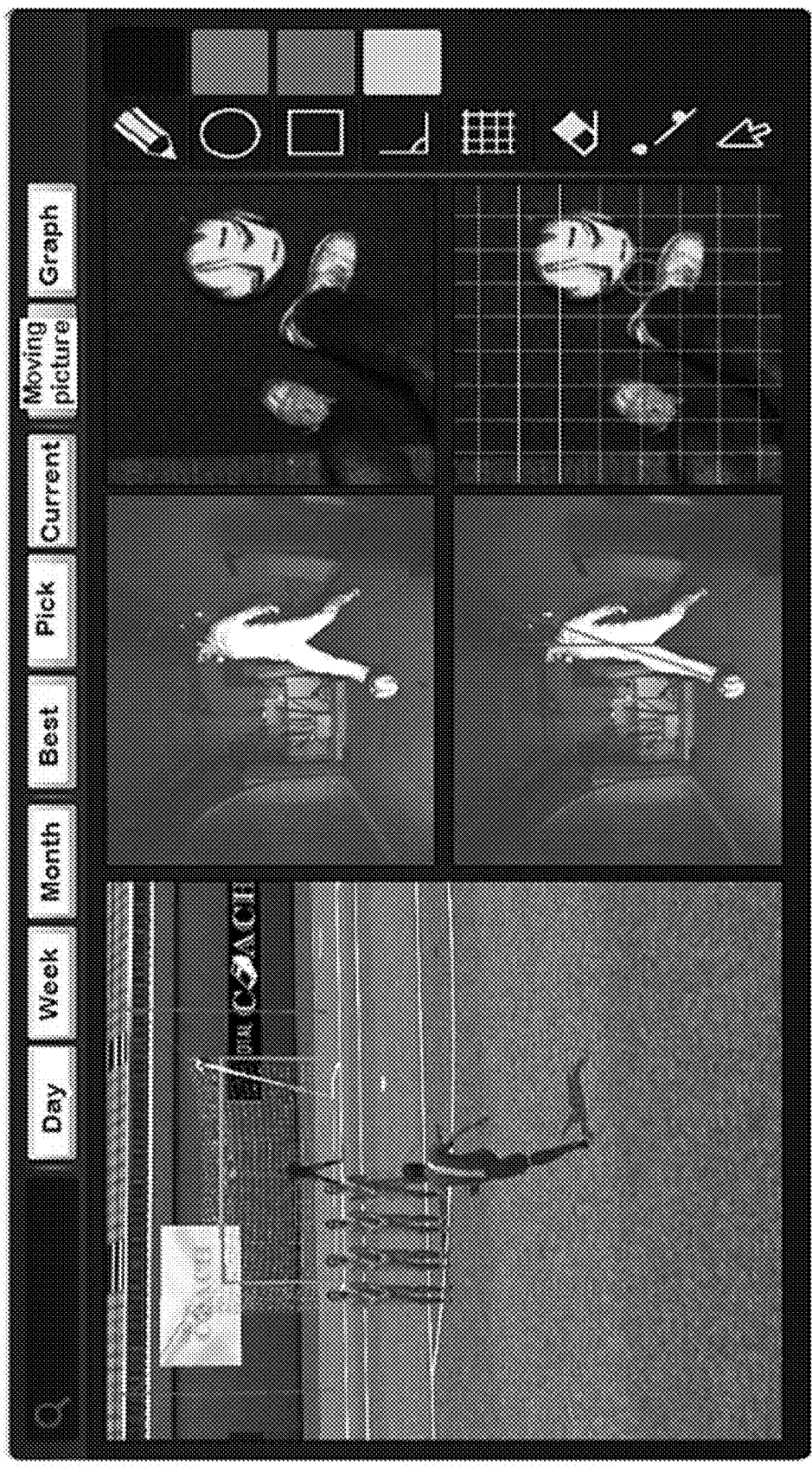
FIG. 9 exemplarily illustrates a simulation result and a user's kick analysis scene illustrated in the image output device.
Figure 10:
FIG. 10 illustrates an appearance in which a still image in a user's kick motion is displayed on a user device.

FIG. 9 exemplarily illustrates a simulation result and a user's kick analysis scene illustrated in the image output device and FIG. 10 illustrates an appearance in which a still image in a user's kick motion is displayed on the user device 140.

Figure 4:
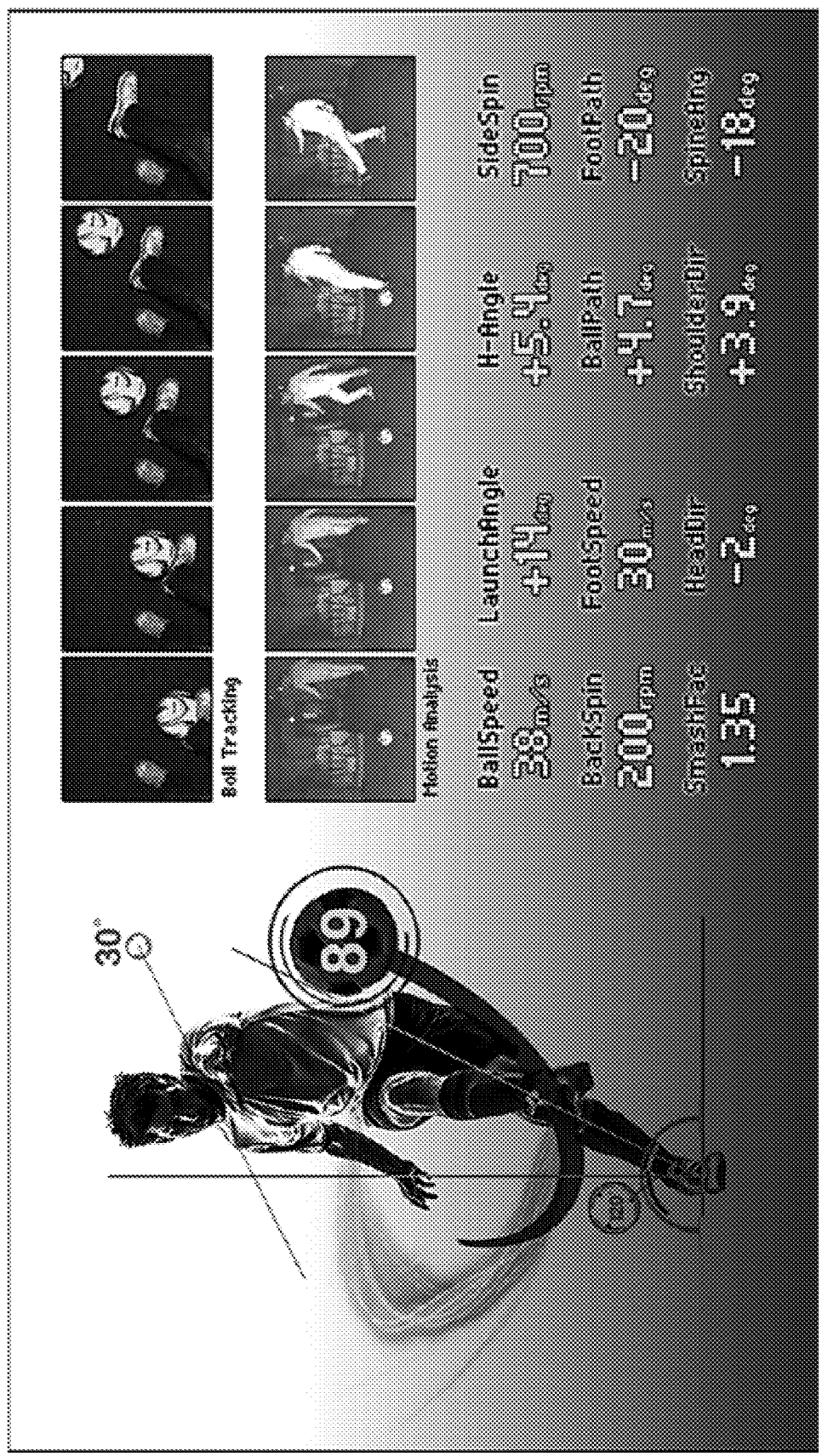
FIG. 4 exemplarily illustrates of user's kick information in a set piece simulation system according to an embodiment of the present invention.

Through this step, as illustrated in FIGS. 9 and 10, a screen may be provided to analyze a central axis of a user's body, locations of a stepping foot and a kicking foot, an angle formed between a kick central axis and a body central axis, a contact point between the soccer ball and the kicking foot, etc, when the user kicks a soccer ball. FIG. 4 illustrates exemplarily user's kick information in the set piece simulation system according to the embodiment of the present invention, and as illustrated in FIG. 4, various information may be provided as information including images and texts.

Next, the method includes analyzing a movement path of the soccer ball by analyzing the kick motion image or the kick information, by means of the kick information analysis unit 113 of the service server 110 (S140). In this step, the kick information analysis unit 113 may be implemented by using a calculation device, a calculation method, and the like for calculating physical quantities used in a screen sports simulation device.

Here, the analyzing of the movement path of the soccer ball may further include correcting the movement path by using environmental condition data provided from a room condition control device received through the data transmission/reception unit 111. In an actual soccer game as an example, the soccer ball has a larger volume than other sports. Therefore, considering the characteristics of the outdoor game, an influence of wind on the movement path of the soccer ball after kicking should be considered. In addition, a friction coefficient of the surface of the soccer ball may vary depending on a temperature condition and a precipitation condition of the field.

The room condition control device is provided with a moisture providing device, a blowing device 150, or the like to not only create conditions such as actual humidity and wind, but also provide data of the degree of actual occurrence to the kick analysis unit, thereby performing realistic sensory training.

Next, the method includes storing the trajectory of the soccer ball, and the speed and spin information of the ball in a predetermined area on the set piece background screen by using the analyzed movement path, by means of the image processing unit 114 of the service server 110 (S150).

The trajectory of the soccer ball analyzed by the kick information analysis unit 113 is displayed on the screen, and spin information about the speed and spin rate of the soccer ball is provided in a text form and displayed to the user, thereby performed effective training for the set piece situation.

The method for providing the set piece simulation according to the present invention may be provided so as to be displayed together on a tablet computer provided with a touch screen in addition to an image output device such as a screen for coaching.

To this end, the method may further include receiving coaching information from the user device 140 through the data transmission/reception unit 111, generating hitting information about the speed, posture, and direction of a kick, or a hitting point of the soccer ball by using the coaching information by means of the kick information analysis unit 113 of the service server 110, and displaying the hitting information in a predetermined area of the image output device by means of the image output unit 112 of the service server 110.

At this time, the user device 140 may use a tablet computer and the like including a touch input unit. In addition, the coaching information may be provided to enable an intuitive input of coaching information by including dragging information input by the touch input unit.

Figure 11:
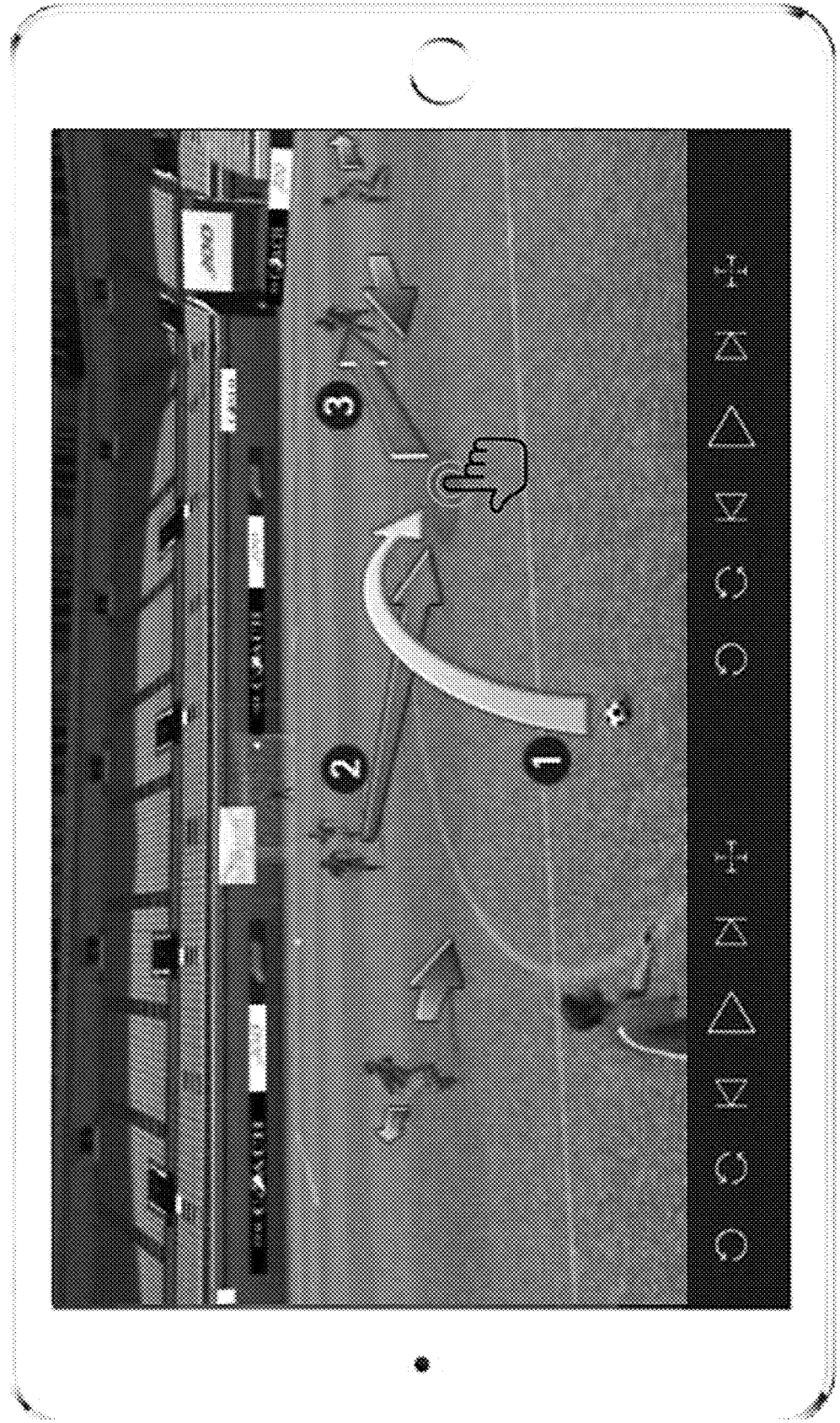
FIGS. 11 to 13 illustrate a screen of the user device for inputting coaching information.
Figure 12:
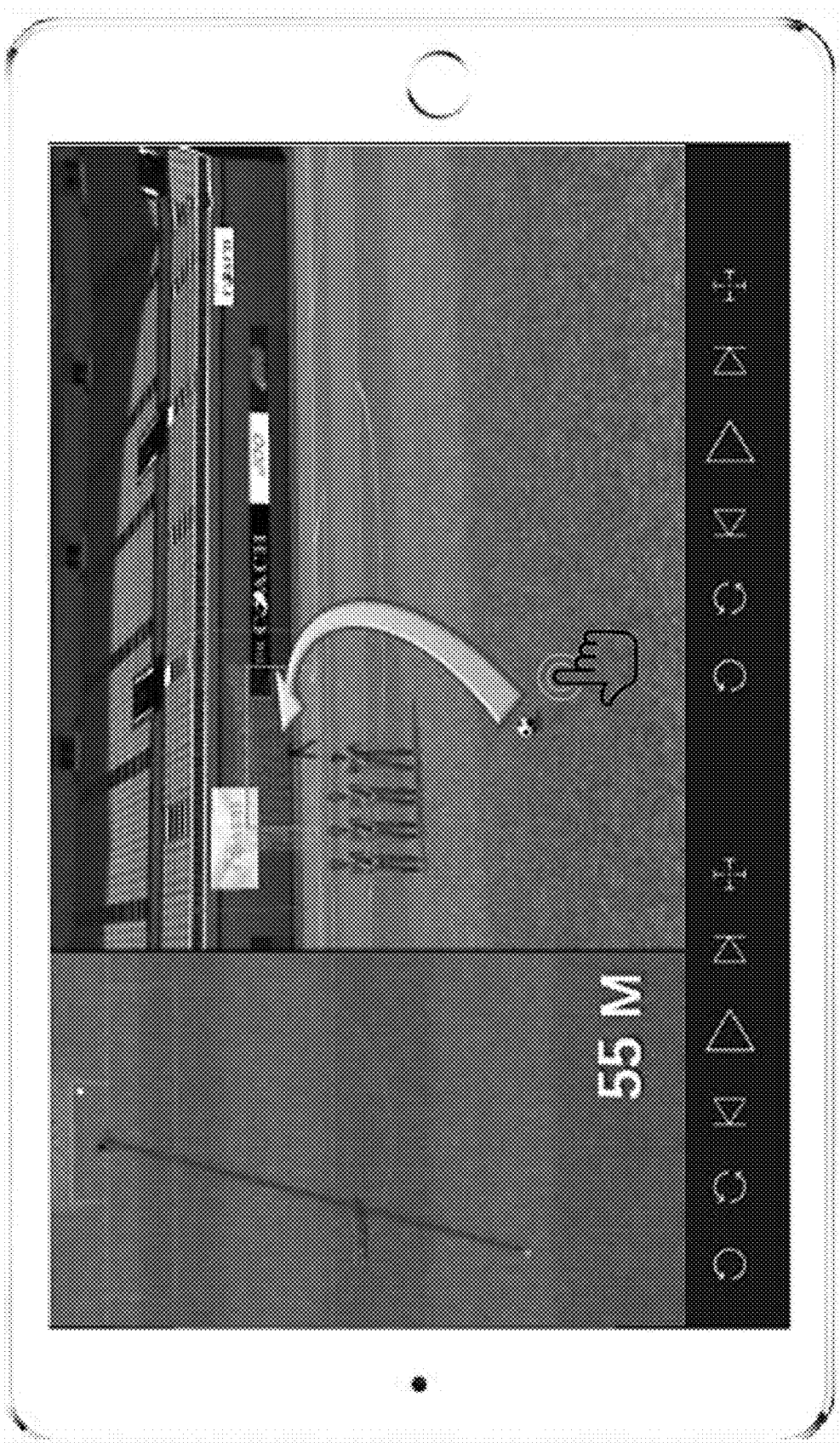
Figure 13:
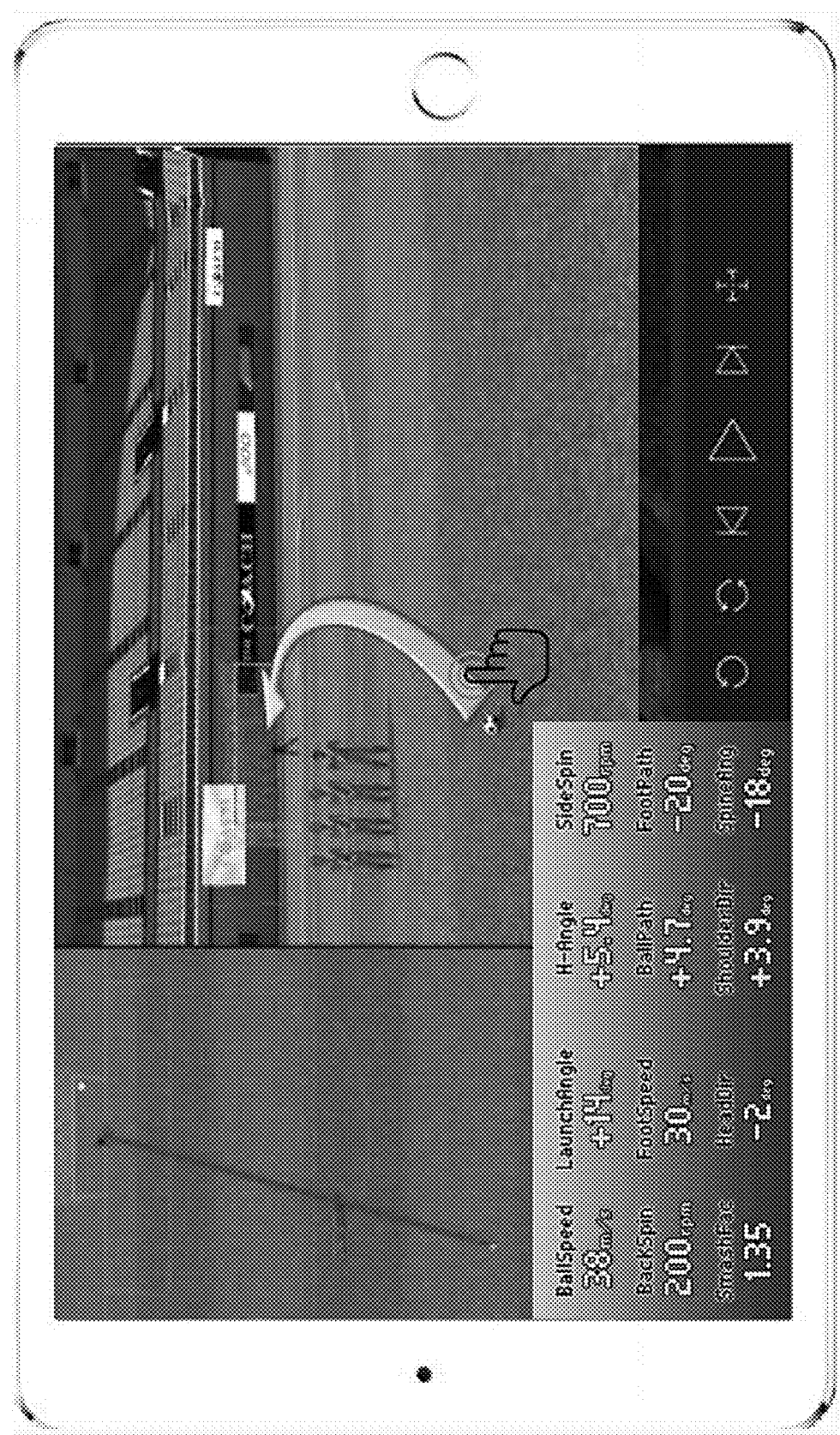

FIGS. 11 to 13 illustrate a screen of the user device 140 for inputting coaching information.

First, referring to FIG. 11, a state of coaching a set piece situation corresponding to a free kick through a touch screen of the user device 140 is illustrated as an example. Coaching information related to Nos. 1, 2, and 3 in FIG. 11 may be input through a method of dragging the input window with a finger, and such information may be simultaneously displayed on the display window and the screen of the tablet computer. Through this, appropriate coaching for the set piece situation and repetitive set piece practices may be performed.

As illustrated in FIG. 12, when the trajectory of the soccer ball is input in a target direction through the dragging input, various information such as the ball speed of the soccer ball is provided as illustrated in FIG. 13 to provide more detailed information to the user kicking the ball, thereby performing the coaching.

Figure 14:
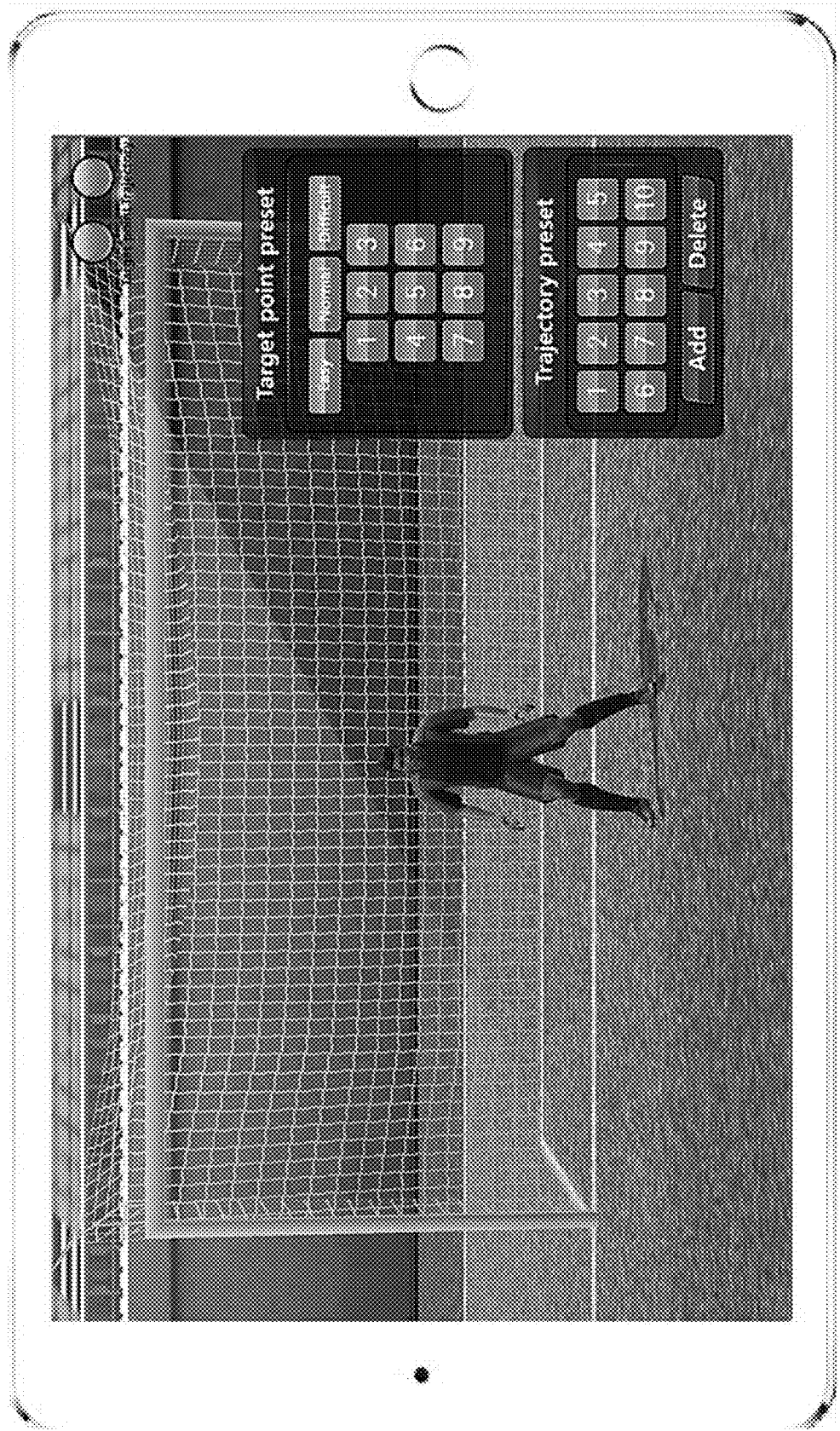
FIGS. 14 and 15 are diagrams illustrating a method for providing a simulation for a set piece situation in a penalty kick or free kick situation for setting of a goalkeeper.
Figure 15:
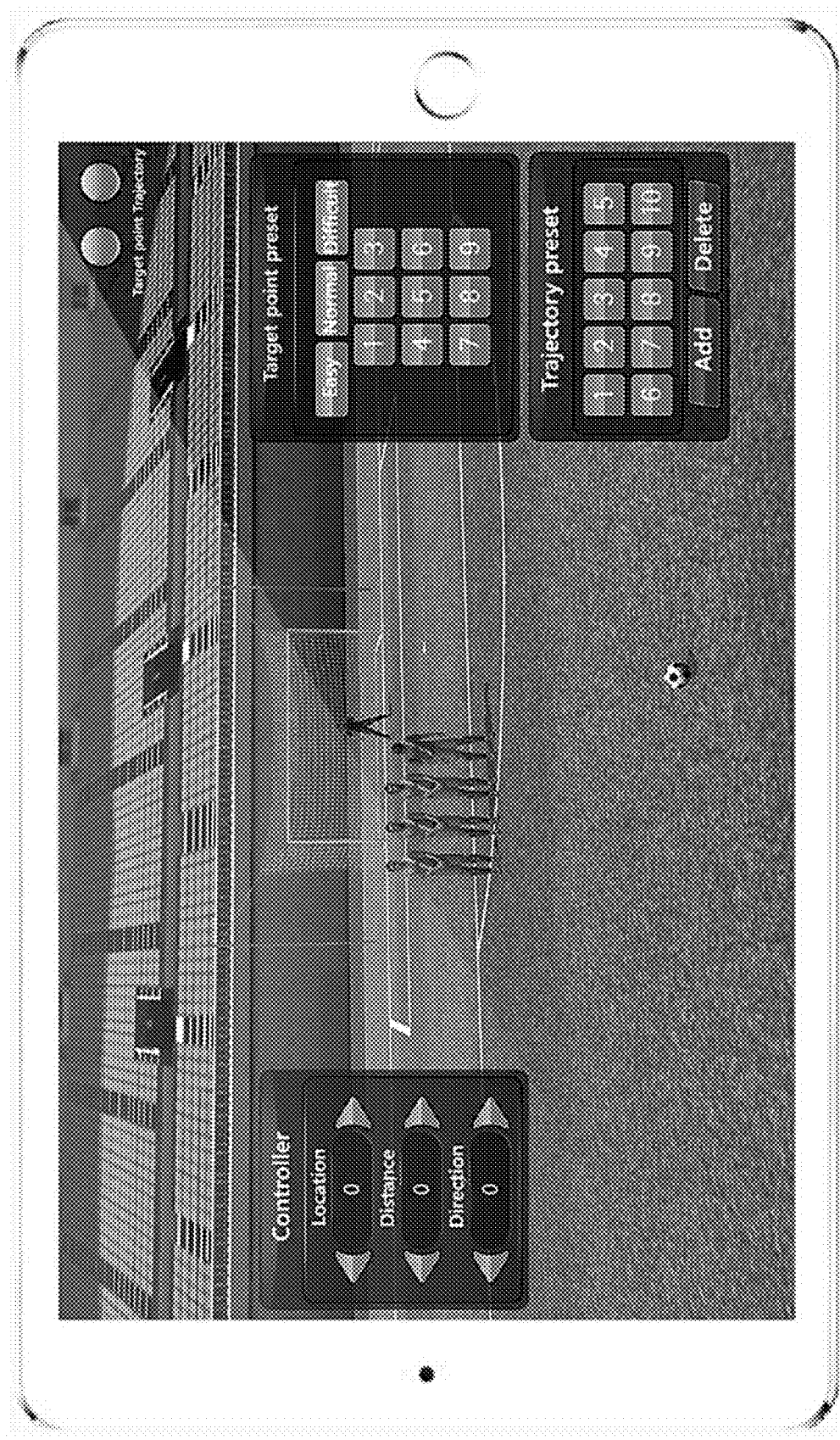

FIGS. 14 and 15 are diagrams illustrating a method for providing a simulation according to another embodiment of the present invention.

FIG. 14 illustrates a set piece situation for a penalty kick, and FIG. 15 illustrates a set piece situation for a free kick, and a touch input may be made to set a target point preset and a trajectory preset through the user device.

When the soccer ball is displayed so as to fly toward a target point after the setting, the image output unit 112 may output an image in which a goalkeeper on the image output device moves to the target point of the ball to block the goal. Thereafter, the kick information analysis unit 113 may be provided to generate information about the speed, posture, and direction of the kick, or the hitting point of the soccer ball and the shape of the foot at the time of hitting to provide the generated information to the user through the image output device.

Through the above, it is possible to provide an effect of learning the kick information of an attacker in a penalty kick or free kick situation and performing image training for blocking a goal in terms of the goalkeeper.

Meanwhile, the goalkeeper image may be provided to block a goal according to a preset method, but is not limited thereto, and may be provided so that the user arbitrarily drags the goalkeeper.

The displaying of the trajectory of the soccer ball, the speed and spin information of the ball (S150) may be provided to display dragging information of the goalkeeper image together. That is, the dragging information may be provided to the image output unit 112 and displayed through the image output device. Through this step, a plurality of users may each practice roles of an attacker and a goalkeeper at the same time.

As described above, the embodiments of the present invention have been mainly described, but are just examples and do not limit the present invention, and those skilled in the art to which the present invention pertains will appreciate that various modifications and applications not illustrated above can be made without departing from the essential characteristics of the embodiments of the present invention. For example, each component specifically illustrated in the embodiments of the present invention can be modified and implemented. In addition, differences related to these modifications and applications should be construed as being included in the scope of the present invention defined in the appended claims.

The invention claimed is:

1. A set piece simulation system as a system for providing a soccer set piece simulation, the system comprising a data transmission/reception unit, an image output unit, a kick information analysis unit, and an image processing unit,
wherein the data transmission/reception unit receives the location of a soccer ball from a sensing device,
the image output unit outputs a set piece background screen to an image output device which wiredly or wirelessly communicates with the data transmission/reception unit and outputs, to one side of the image output device, the sensed location of the soccer ball and auxiliary information in which a left or right angle or an upper or lower angle based on the location of the soccer ball is provided in the form of an image or text,
the data transmission/reception unit receives a user's kick motion image transmitted through an image capturing device and kick information including one or more pieces of information about the speed, spin rate, and direction of the soccer ball caused by the user's kick,
the kick information analysis unit analyzes the movement path of the soccer ball by analyzing the kick motion image or the kick information, and
the image processing unit displays the trajectory of the soccer ball and the speed and spin information of the ball in a predetermined area of the set piece background screen by using the analyzed movement path.

2. The set piece simulation system of claim 1, wherein the kick information analysis unit is provided to correct the movement path by using environmental condition data provided from a room condition control device received through the data transmission/reception unit by analyzing the movement path of the soccer ball, wherein the room condition control device is a moisture providing device or a blowing device.

3. The set piece simulation system of claim 1, wherein the data transmission/reception unit receives coaching information from the user device, the kick information analysis unit generates hitting information about the speed, posture, and direction of a kick, or a hitting point of the soccer ball using the coaching information, the image output unit is provided to display the hitting information in a predetermined area of the image output device, and the user device includes a touch input unit, wherein the coaching information includes dragging information input through the touch input unit.

4. The set piece simulation system of claim 1, wherein the image output unit is provided to output a target or virtual goalpost image generated by using actual set piece situation information input from the user device in a predetermined area displayed with the image of the image output device.

5. The set piece simulation system of claim 1, wherein the image output device includes a monitor having a display unit, a screen device including a screen and a projection device, or a laser output device that outputs a virtual image using a laser.

6. A method for providing a set piece simulation comprising:

receiving, by means of a data transmission/reception unit of a service server, the location of a soccer ball from a sensing device;
outputting, by means of an image output unit of the service server, a set piece background screen to an image output device which wiredly or wirelessly communicates with the data transmission/reception unit and outputting, to one side of the image output device, the sensed location of the soccer ball and auxiliary information in which a left or right angle or an upper or lower angle based on the location of the soccer ball is provided in the form of an image or text;
receiving, by means of the transmission/reception unit, a user's kick motion image transmitted through an image capturing device and kick information including one or more pieces of information about the speed, spin rate, and direction of the soccer ball caused by the user's kick;
analyzing, by means of a kick information analysis unit of the service server, the movement path of the soccer ball by analyzing the kick motion image or the kick information; and
displaying, by means of an image processing unit of the service server, the trajectory of the soccer ball and the speed and spin information of the ball in a predetermined area on the set piece background screen by using the analyzed movement path.

7. The method for providing the set piece simulation of claim 6, wherein the analyzing of the movement path of the soccer ball further comprises correcting the movement path by using environmental condition data provided from a room condition control device received through the data transmission/reception unit,
wherein the room condition control device is a moisture providing device or a blowing device.

8. The method for providing the set piece simulation of claim 6, further comprising:
receiving, by means of the data transmission/reception unit, coaching information from the user device;
generating, by means of the kick information analysis unit of the service server, hitting information about the speed, posture, and direction of a kick, or a hitting point of the soccer ball by using the coaching information; and
displaying, by means of the image output unit of the service server, the hitting information in a predetermined area of the image output device,
wherein the user device includes a touch input unit and the coaching information includes dragging information input through the touch input unit.

9. The method for providing the set piece simulation of claim 6, wherein the outputting of the auxiliary information further comprises outputting, by means of the image output unit, a target or virtual goalpost image generated by using actual set piece situation information input from the user device in a predetermined area displayed with the image of the image output device.

10. A storage medium storing a computer program for performing the method for providing the set piece simulation according to claim 6 on a computer.

* * * * *